No. 868,573. PATENTED OCT. 15, 1907.
C. E. LORD.
CONTROLLER.
APPLICATION FILED AUG. 30, 1905. RENEWED MAY 20, 1907.

2 SHEETS—SHEET 1.

Witnesses:
George J. Schwartz
Fred J. Kinsey

Inventor:
Chas. E. Lord

No. 868,573. PATENTED OCT. 15, 1907.
C. E. LORD.
CONTROLLER.
APPLICATION FILED AUG. 30, 1905. RENEWED MAY 20, 1907.
2 SHEETS—SHEET 2.
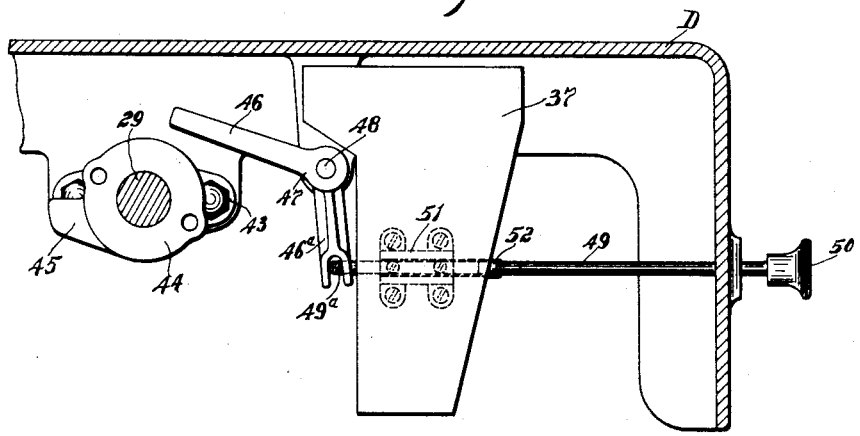
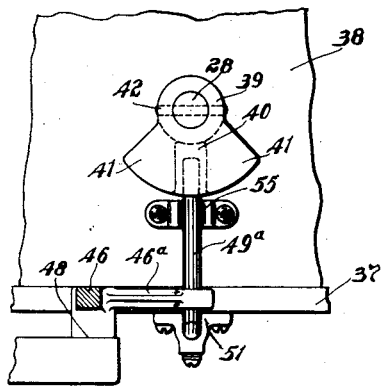
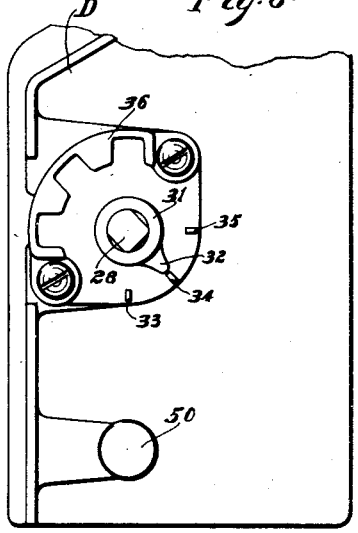
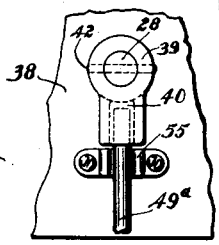
Witnesses:
George J. Schwartz
Fred J. Kinsey
Inventor:
Chas. E. Lord

UNITED STATES PATENT OFFICE.

CHARLES E. LORD, OF NORWOOD, OHIO, ASSIGNOR TO THE BULLOCK ELECTRIC MANUFACTURING COMPANY, A CORPORATION OF OHIO.

CONTROLLER.

No. 868,573.      Specification of Letters Patent.      Patented Oct. 15, 1907.

Application filed August 30, 1905, Serial No. 276,347. Renewed May 20, 1907. Serial No. 374,724.

*To all whom it may concern:*

Be it known that I, CHARLES E. LORD, a citizen of the United States, residing at Norwood, in the county of Hamilton and State of Ohio, have invented certain new and useful Improvements in Controllers, of which the following is a full, clear, and exact specification.

My invention relates to improvements in controllers for electric motors and particularly to an improved form of interlocking mechanism between the main switch and the cut-out switch of a railway controller.

In the operation of a series-parallel controller for railway or other purposes, it is desirable to provide means for cutting out one or more of the motors regulated by the main switch of the controller and at the same time leave the motor circuits in such condition that the remaining motor or motors may be regulated rheostatically, or otherwise, by the main switch. With series-parallel controllers as ordinarily constructed, the main switch should be arrested in a predetermined position, preferably in its final series position, when a motor is cut out, and the remaining motor or motors regulated by means of resistance. The stop for arresting the main switch prevents the latter from moving into the parallel positions of the controller and thereby prevents damage due to improper connections and short-circuits.

The object of my invention is to produce a simple form of interlocking mechanism between the main switch and the motor cut-out means, and to so construct and arrange the same that it is readily accessible and independently controlled from the exterior of the controller casing.

The invention therefore comprises improvements in the construction and arrangement of the interlocking mechanism between the main switch and the cut-out switch, which will be hereinafter explained and more specifically pointed out in the appended claims.

Figure 1:
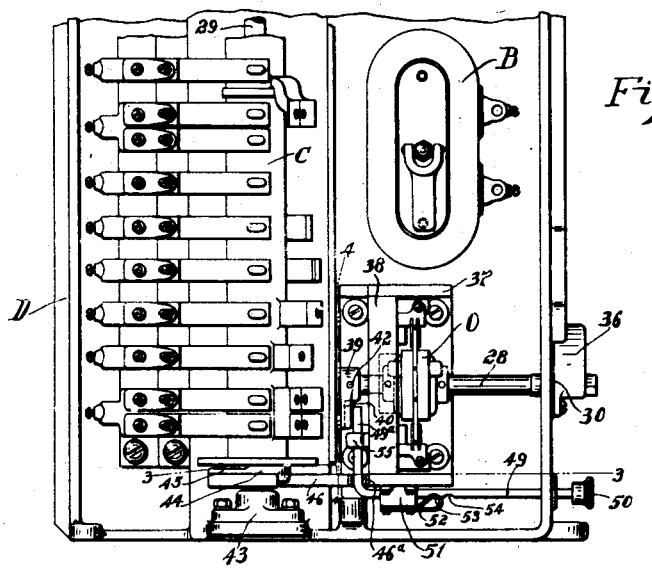
Figure 2:
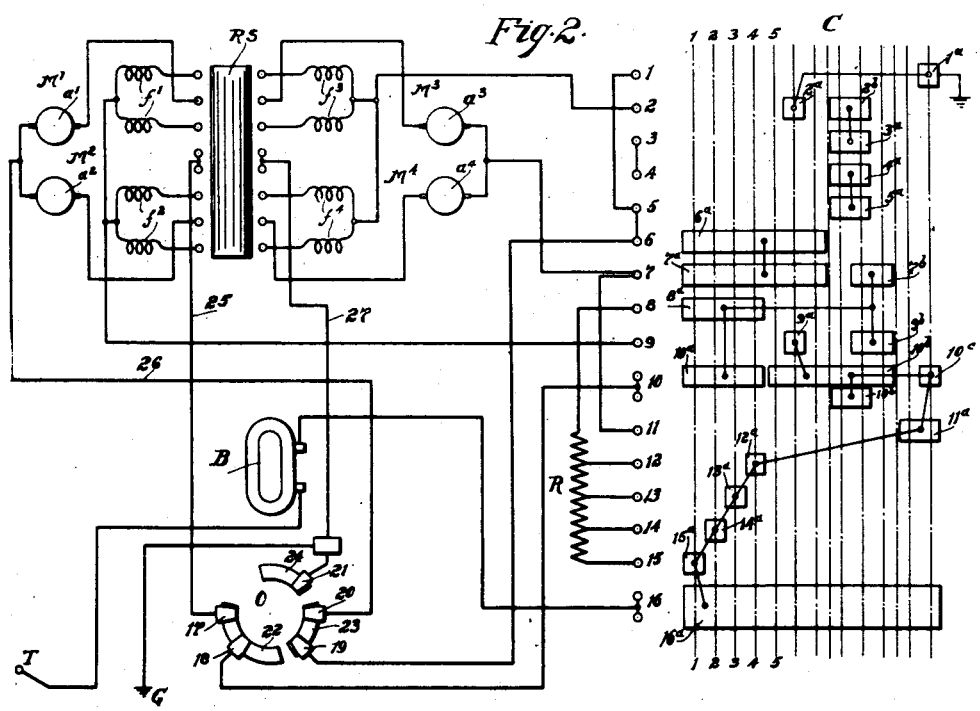

In the accompanying drawings, which illustrate preferred embodiments of my invention, Figure 1 is a front elevation of the lower part of a railway controller equipped with my improvement; Fig. 2 is a diagram of motor connections made by said controller; Fig. 3 is a sectional plan view on line 3—3 of Fig. 1; Fig. 4 is a detail of the interlock mechanism, being a partial sectional elevation on line 4—4 of Fig. 1, looking toward the right; Fig. 5 is a slightly modified form of the device shown in Fig. 4; and Fig. 6 is a detail side elevation of the exterior of the lower part of the controller casing.
Referring now to Fig. 2, in which I have illustrated the connections made by a series-parallel controller to which my improved interlocking mechanism is applicable, the motors are indicated at $M'$, $M^2$, $M^3$ and $M^4$, the reversing switch at RS, the cut-out switch at O and the main cylinder of the controller in development at C.

The contact fingers of the controller are designated by 1 to 16 inclusive, and the segments of the main cylinder adapted to engage said fingers are designated by $1^a$ to $16^a$ inclusive, $2^b$, $7^b$, $9^b$, $10^b$ and $10^a$.

The regulating resistance is shown at R and the blow-out magnet at B.

The cut-out switch O comprises the fixed contact fingers 17 to 21 inclusive and the rotatable contact segments 22, 23, and 24.

In the operation of the controller herein illustrated, with the cut-out switch in the position shown, when the main drum is moved into its first operative position, indicated by the vertical line 1—1, a circuit is completed through the controlled motors which may be traced as follows; from trolley T, through blow-out magnet coil B, contact finger 16, thence through contact segments $16^a$ and $15^a$; contact finger 15, resistance R, contact finger 8, segments $8^a$ and $10^a$, finger 10, contact fingers 18 and 17, and segment 22 of cut-out switch O, conductor 25 to reversing switch RS, through contacts on same and through fields $f^1$ and $f^2$ and armatures $a^1$ and $a^2$ of motors $M^1$ and $M^2$ in parallel to conductor 26, thence through contact fingers 20 and 19 and segment 23 of cut-out switch O to contact finger 6 of main switch, thence through segments $6^d$ and $7^a$, contact finger 7, through armatures $a^3$ and $a^4$ and fields $f^3$ and $f^4$ of motors $M^3$ and $M^4$ in parallel, through contacts on reversing switch RS to conductor 27 and to ground at G. Considering the motors $M'$ and $M^2$ as a single motor and the motors $M^3$ and $M^4$ as a single motor, said motors are connected in series with each other and in series with the regulating resistance R in this position of the main switch. As the main switch is moved forward the resistance R is cut out step by step until the motor pairs are connected in series without resistance in the position indicated by vertical line 5—5. This is the final series position of the motor controller. The subsequent positions connect the motors and resistance in a manner readily traced upon the diagram until the motors are connected in parallel in the final position of the controller.

When the cut-out switch O is moved in a counter-clockwise direction the pair of motors $M'$ and $M^2$ are cut out of circuit and the remaining motors are connected in circuit so that they may be regulated rheostatically by the main switch. When the cut-out switch is moved in a clockwise direction the pair of motors $M^3$ and $M^4$ are cut out of circuit and the remaining motors are connected so as to be regulated rheostatically by the main switch. When any motor, or pair of motors, is cut out of circuit it is desirable to limit the movement of the main switch, that is, to arrest same in a predetermined position, such as the final series position. In the system here illustrated, I limit the main switch to its first five operative positions and arrest same in its fifth or final series position when either motor or pair of motors is cut out of circuit. To this end I provide an improved interlocking mechanism between the cut-out switch and the main switch which will now be described.

Referring to the remaining figures of the drawings, it will be seen that the main switch C and the cut-out switch O are mounted in the controller casing D, the shaft 28 of the cut-out switch being preferably arranged at right angles to the shaft 29 of the main switch and projects through the controller casing at 30. The outer end of the shaft 28 is irregular shaped to receive an operating handle, preferably the standard reversing switch handle. Surrounding said shaft 28 outside said casing is a collar 31 carrying the index finger 32 pointing to the projections 33, 34, and 35 indicating the positions of the cut-out switch. The controller casing adjacent to said projecting shaft is provided with a notched locking flange 36 adapted to coact with the operating handle in a well known manner. This arrangement is clearly shown in Fig. 6. The cut-out switch is mounted within the projecting casing 37 through the back 38 of which projects said shaft 28 which has mounted thereon the collar 39 formed with the recess 40 and the flanges 41. Said collar is preferably fastened to shaft 28 by pin 42 and is adapted to coact with the independently controlled stop for the main switch in a manner to be hereinafter described.

Mounted upon the lower end of shaft 29 just above the step bearing 43 is a collar 44 carrying the lug 45 corresponding to the final series position of the controller or to any other position in which it is desired to arrest the main switch when the cut-out switch is operated. The stop which is adapted to be moved into the path of said lug 45 is the arm 46. This arm 46 forms one arm of the bell-crank lever 47 pivoted at 48, the other arm 46ª of said lever 47 being bifurcated to receive the vertical extension 49ª of the controlling rod 49. Said rod 49 extends through the controller casing and is provided with an operating knob 50, (see Fig. 3). Rod 49 is reciprocably mounted in the bearing 51 fastened to the under side of the casing for the cut-out switch. To hold the stop controlling mechanism firmly in its position, I provide a spring finger 52 to engage the notches 53 and 54 formed in the controlling rod 49. As an additional guide for said stop controlling mechanism I provide the U shaped member 55 to constrain the movements of the vertical projections 49ª. In the modification shown in Fig. 5, the flanges 41 have been omitted from the collar 39.

In the operation of my invention, considering the stop in its normal position, the main switch may be moved freely through its entire range of movement, but the cut-out switch is locked against movement since the extension 49ª lies in the recess 40 formed in the collar 39. Before the cut-out switch may be operated to cut out a motor, or pair of motors, it is necessary to operate the independently controlled stop for the main switch. This is accomplished by grasping the knob 50 and moving the rod 49 outwardly into the position shown in the figures. This movement throws the arm or stop 46 into the path of lug 45 and removes the extension 49ª from recess 40 and unlocks the cut-out switch. The cut-out switch may then be moved as desired, but the main switch cannot be moved beyond the operative position determined by the position of the lug 45. The flanges 41 upon the collar 39 may or may not be employed as desired. When employed they act to prevent the stop 46 from being thrown back while the cut-out switch is in a position to cut out a motor.

I am aware that a mechanical series-stop has been employed heretofore to limit the movement of a series parallel regulating drum in a motor controller, such for instance as shown in the patent to W. B. Potter, reissue No. 12,241, July 19, 1904, and I therefore do not claim such a series-stop broadly. However, in the appended claims I aim to cover all modifications of my invention which do not depart from its spirit and scope.

Having thus described my invention, what I claim as new and desire to secure by Letters Patent is—

1. In combination, a switch for regulating two or more electric motors in series and then changing them to parallel relationship, means for controlling said regulating switch, a switch for cutting out each of the motors, means for controlling the cut-out switch, interlocking mechanism between the cut-out switch and the regulating switch, and independent controlling means for said interlocking mechanism.

2. In combination, a switch for connecting two motors either in series or in parallel, a cut-out switch for cutting out one motor and for connecting one terminal of the other motor to the opposite line, a stop for the series-parallel switch, and means independent of the cut-out switch for controlling the operation of said stop.

3. In combination, a controller casing containing a series-parallel switch, a cut-out switch, and a stop for the series-parallel switch, and independent controlling means accessible from the exterior of said casing for the cut-out switch and the stop respectively.

4. In combination, a main switch for regulating two electric motors in series and then changing them to parallel, a cut-out switch for cutting out either of the two motors, a stop for arresting the main switch in a predetermined position, and independent means for controlling said stop.

5. In combination, a main switch for regulating two electric motors in series and then changing them to parallel, a cut-out switch for cutting out either of the two motors, a stop for arresting the main switch in a predetermined position, means independent of the cut-out switch for controlling said stop, and means connected with the stop controlling means for locking the cut-out switch against movement when the stop is in an inoperative position.

6. In combination, a main switch for regulating two electric motors by means of a resistance and then changing them from series to parallel, a cut-out switch for cutting out either of the two motors, a stop limiting the movement of the main switch to those points at which the regulation by means of the resistance is effected, and independent means for controlling the operation of said stop.

7. In combination, a main switch for regulating two or more electric motors in series and then changing them to parallel, means for cutting out either of the motors, a stop for arresting the main switch in a predetermined position when the cut-out means is in a position to cut out one of the motors, independent means for controlling the operation of the stop, and means carried by the stop controlling means for preventing a movement of said cut-out means from its inoperative position until the stop has been moved into its operative position.

8. In combination, a pair of motors, a main switch for regulating said motors in series and then changing them to parallel, a cut-out switch for cutting out either of said motors, a stop for arresting the main switch in a predetermined position, means independent of the cut-out switch for operating said stop, and an interlock between the cut-out switch and said stop which renders it necessary for the stop to be thrown into its operative position before the cut-out switch can be moved to cut out a motor.

9. In combination, a main switch for regulating two or more electric motors, means for cutting out either of the motors, a stop for arresting the main switch in a predetermined position when the cut-out means is in a position to cut out one of the motors, independent means for operating the stop, and means for locking the stop operating means in position when the cut-out means is in a position to cut out a motor.

In testimony whereof I affix my signature, in the presence of two witnesses.

CHARLES E. LORD.

Witnesses:
SANFORD KLEIN,
FRED J. KINSEY.